April 3, 1934. G. H. B. WEST 1,953,576

GREASE RETAINING SEAL COVER FOR STORAGE BATTERIES

Filed Sept. 24, 1931

Inventor

George H. B. West,

By Augustus B. Stoughton

Attorney

Patented Apr. 3, 1934

1,953,576

UNITED STATES PATENT OFFICE 1,953,576

GREASE RETAINING SEAL COVER FOR STORAGE BATTERIES

George H. B. West, Philadelphia, Pa., assignor to The Electric Storage Battery Company, Philadelphia, Pa., a corporation of New Jersey Application September 24, 1931, Serial No. 564,739

2 Claims. (Cl. 136—177)

The object of my invention is to prevent creepage of acid from the filling opening of storage batteries and to thereby prevent wetting of the top of the battery with acid and the consequent corrosion caused thereby. In order to prevent this corrosion I provide the seal cover with a ring shaped groove for retaining grease surrounding the filling opening in the cell cover and grease in said groove.

For a further exposition of my invention reference may be had to the annexed drawing and specification at the end whereof my invention will be specifically pointed out and claimed.

Figure 1:
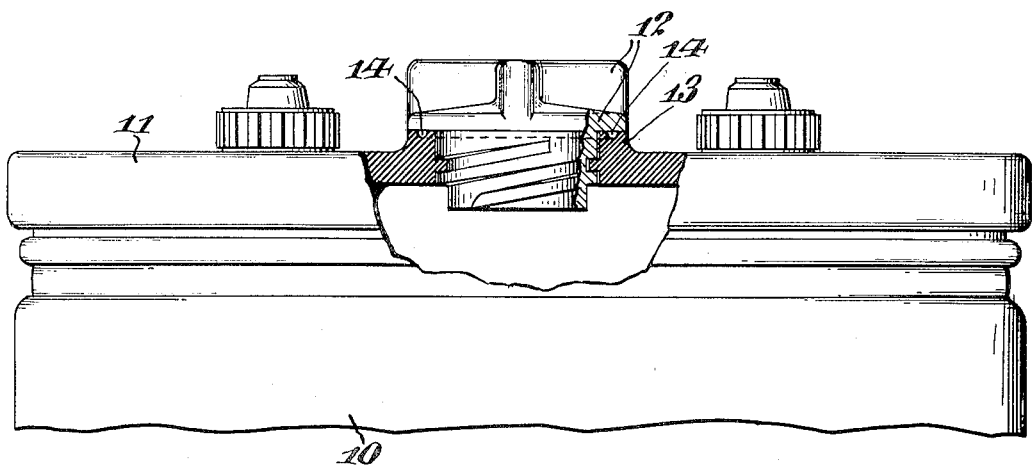
Figure 1 is a side elevation of my device with parts broken away.
Figure 2:
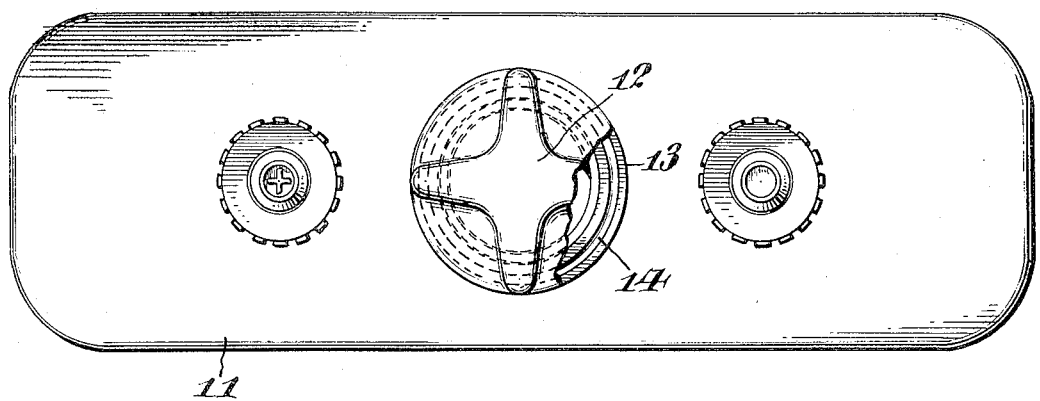
Figure 2 is a plan view of my device with parts broken away.

In the drawing I have illustrated one embodiment of my invention chosen from other embodiments. This consists of a storage battery casing 10 having connected to its upper end a cell cover 11 which has a filling opening therein. The filling opening is normally closed by a vent plug 12 which has screw threaded or other quick detachable connection with the cell cover 11. Cell cover 11 is provided with a projecting collar 13 against which the lower face of the vent plug 12 may abut.

On its upper surface surrounding the filling opening the cell cover 11 is provided with a cavity for retaining grease. This cavity is shown in the shape of a groove 14 surrounding the filling opening 14.

In using my invention the groove 14 is filled with grease or other material which prevents the creepage or passage of acid. The filling plug 12 is then put in place so that its lower face abuts the upper surface of cell cover 11. The grease in groove 14 thus forms a seal between the cell cover 11 and the filling plug 12 and prevents the creepage or escape of acid from the filling opening.

I do not intend to be limited in the practice of my invention save as the scope of the prior art and of the attached claims may require.

I claim:

1. Means for preventing the creepage of acid to the top of storage batteries including in combination a cell cover having a filling opening therein, said cell cover having a cavity for retaining grease encircling said filling opening, a filling plug normally detachably located in said filling opening and having a lower face confronting said cavity, and grease in said cavity contacting with said plug when the latter is in position.

2. Means for preventing the creepage of acid to the top of storage batteries including in combination, a cell cover having a filling and venting opening therein, said cell cover having a projecting collar surrounding said opening and having a cavity in the top of said collar with an open face at the top of said cell cover, said cavity retaining grease encircling the filling opening, and a filling plug normally detachably located in said opening and overlying said cavity so as to close the open face of the cavity when the plug is in normal position.

GEORGE H. B. WEST.